(No Model.)
J. SMAILL.
HORSE DETACHER.
No. 507,461. Patented Oct. 24, 1893.
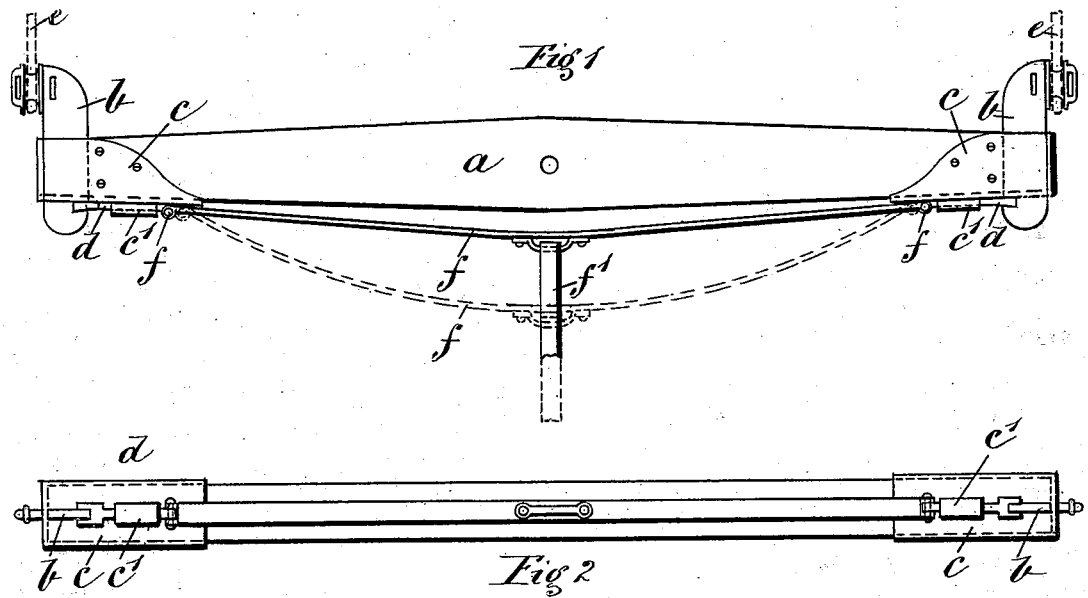
Witnesses
Henry Hughes Jr.
Robert Gamble
Inventor
John Smaill
per Henry Hughes
attorney

UNITED STATES PATENT OFFICE.

JOHN SMAILL, OF DUNEDIN, NEW ZEALAND.

HORSE-DETACHER.

SPECIFICATION forming part of Letters Patent No. 507,461, dated October 24, 1893.

Application filed October 8, 1891. Serial No. 408,168. (No model.)

*To all whom it may concern:*

Be it known that I, JOHN SMAILL, a subject of the Queen of Great Britain, residing at the city of Dunedin, in the Colony of New Zealand, have invented a new and useful Singletree, of which the following is a specification.

My invention relates to improvements in single trees and mountings for the same, and the objects of my invention are to provide a ready and efficient means by which the horses can be released from the carriage, and more especially to effect their instant release when running away. I attain these objects by the mechanism illustrated in the accompanying drawings, in which—

Figure 1 is a plan or elevation of my improved single tree. Fig. 2 is a side view of the same.

Similar letters refer to similar parts throughout both the views.

$a$ is the single tree body.

$b\ b$ are the couplers sliding in guides $c$ which clip the ends of the single tree, and also in slots formed in the ends of the single tree; these couplers receive the traces $e$ to which they are attached in any usual manner.

$d\ d$ are bolts sliding in slot pieces $c'$ attached to the guide $c$, which bolts are wedge shaped at one end so as to fit into the couplers $b$ as shown in Fig. 1 and retain the said couplers in their normal position.

$f$ is a spring or spring bar hinged to the bolts $d$ and controlled by a strap or cord $f'$ so that it can be readily drawn into the position shown by the dotted lines.

It will be seen from this description of the several parts, and by reference to the drawings that my improved single tree consists in attaching to the ordinary single tree couplers $b\ b$ which carry the traces, that these couplers are capable of being loosened when desired by means of the cord or strap $f'$ which can be loosened or drawn up by the driver by means of any suitable lever or winch fixed to the carriage. When the spring or spring bar $f$ attains the position as shown by the dotted lines in Fig. 1 so as to free the bolts $d$ from the couplers $b$, then the traces $e$ with the couplers $b$ are completely freed.

Having now described and particularly ascertained the nature of my said invention and in what manner the same is to be performed, I declare that what I claim, and desire to secure by Letters Patent, is—

In combination, the single tree, the clips $c$, at the ends thereof, the couplers $b$ passing from front to rear through the said clips and projecting to the rear of the single tree, the bolts $d$ on the rear of the single tree engaging the couplers and the spring bar extending along the side of the single tree and connecting at its ends with the bolts $d$ and the connection $f'$ at the middle part of the spring bar for bending the same and thus withdrawing the bolts $d$, substantially as described.

In witness whereof I have hereunto set my hand in the presence of two witnesses.

JOHN SMAILL.

Witnesses:
 JOSEPH MILLER,
  *King St., Dunedin.*
 H. DRIVER,
  *Castle St., Dunedin.*